INVENTORS
ROBERT S. CODRINGTON
NICK A. SCHUSTER
BY
Brumbaugh, Free, Graves & Donohue
THEIR ATTORNEYS July 15, 1969  R. S. CODRINGTON ET AL  3,456,183
DETECTION OF OIL BY NUCLEAR MAGNETIC RESONANCE
Filed July 30, 1957  2 Sheets-Sheet 2

INVENTORS
ROBERT S. CODRINGTON
NICK A. SCHUSTER
BY
Brumbaugh, Free, Graves & Donohue
THEIR ATTORNEYS

United States Patent Office 3,456,183
Patented July 15, 1969

3,456,183
DETECTION OF OIL BY NUCLEAR MAGNETIC RESONANCE
Robert S. Codrington, Ridgefield, Conn., and Nick A. Schuster, Houston, Tex., assignors, by mesne assignments, to Schlumberger Technology Corporation, Houston, Tex., a corporation of Texas
Filed July 30, 1957, Ser. No. 675,061
Int. Cl. H01s 4/00; G01n 27/78; G01r 33/08
U.S. Cl. 324—.5                                        19 Claims

ABSTRACT OF THE DISCLOSURE

In the particular embodiments of the invention described herein, a quenching agent containing a paramagnetic metal-organic complex ion is added to the drilling mud in an oil well. The quenching agent is selectively soluble in either oil or water so as to cause a reduction in the relaxation time of the protons in one of those materials contained in the surrounding formations, but not in the other.

---

This invention relates to methods of locating hydrocarbons in boreholes and, more particularly, concerns new and improved methods for locating hydrocarbons in well bores by employing nuclear magnetic resonance phenomena.

To aid the recovery of hydrocarbons such as oil or gas from subterranean formations, a variety of techniques have been devised for locating such hydrocarbons by means of suitable detecting instruments which may be lowered into a borehole. Among the more successful techniques in current practice are electrical and radio-activity well logging, fluid testing and fluid sample taking. In contrast to the latter two techniques, the logging techniques have the advantage of providing a continuous record over large intervals of depth with a relatively short interruption of drilling or recovery operations, the records serving upon analysis to delineate permeable formations and otherwise promising zones.

There have recently been devised techniques for locating hydrogen-containing substances in a borehole and, more particularly, for locating hydrocarbons using nuclear magnetic resonance phenomena. Apparatus using magnetic resonance techniques suited for well logging are described, for example, in copending applications Ser. No. 330,978, filed Jan. 13, 1953, now Patent No. 3,289,072; Ser. No. 463,776, filed Oct. 21, 1954, now Patent No. 2,968,762; Ser. No. 473,112, filed Dec. 6, 1954, now Patent No. 3,052,834; and Ser. No. 478,860, filed Dec. 30, 1954, now Patent No. 2,878,443; each by N. A. Schuster; Ser. No. 484,797, filed Jan. 28, 1955, now Patent No. 3,128,425, by R. S. Codrington; Ser. No. 414,379, filed Mar. 5, 1954 by H. F. Schwede, and N. A. Schuster application Ser. No. 538,578, filed Oct. 5, 1955, now Patent No. 3,083,335. As described in these applications, hydrocarbons may be located by including nuclear magnetic resonance in formation material traversed by a well and detecting a signal characterizing such resonance. To induce resonance, the formation material is impressed with an alternating magnetic field which is transverse to a magnetic field of substantially constant intensity. The substantially constant magnetic field tends to line up the individual macroscopic magnetic moments associated with each volume element of the formation material under investigation. When the alternating magnetic field is applied to the sample, each individual macroscopic moment rotates relative to the constant magnetic field in a mode known as a precession, i.e., a rotation of the gyro-magnetic axis about the force axis. By various techniques described in the above-identified applications, nutation (i.e., a tilting or "nodding" of the gyro-magnetic axis away from the force axis) is induced in elements processing at the resonance or Larmor frequency to provide signals corresponding to absorption, emission, susceptibility, or relaxation time characteristics of the material investigated. In accordance with the teachings of these applications, improved signal response may be secured to overcome conditions prevailing in wells which adversely affect the measurement of nuclear magnetic resonance.

As one of these adverse conditions, the geometry of a well renders quite difficult the establishment of a homogeneous magnetic field throughout an appreciable portion of formation material under investigation. In consequence, individual volume elements experience fields of different intensities, whereby the precessions of the individual macroscopic moments are at different angular velocities in accordance with the variation in intensity. This disorder is cumulative with the application of the alternating magnetic field and rapidly diminishes the detectable signal. While this adverse condition is largely overcome by techniques such as those disclosed in the Schuster Patent No. 2,878,443, nonetheless, protons associated with water and with hydrocarbon molecules are not as readily distinguished in the boreholes as at the earth's surface. It has been discovered that the difficulty of distinguishing such protons in a borehole arises not only from the difficulty of making measurements in such an environment but also from changes in the nuclear magnetic resonance properties of protons in the environment of a borehole. At room temperatures the relaxation times of the majority of crude oils are shorter than the relaxation time of water by a factor of three or more. In a well, however, the temperature and viscosity of water and oil are substantially changed. These changes are in a sense which reduces the difference between the relaxation times of crude oils and water and, under the most adverse conditions, may preclude the location of oil separately from water in the formations traversed by a borehole as being beyond the resolving power of any presently devised apparatus. Even under moderately adverse conditions, the resolving power required of apparatus generally require that it be relatively complex and expensive to produce.

Accordingly, it is an object of the present invention to provide new and improved methods for observing nuclear magnetic resonance phenomena under borehole conditions to facilitate the location of oil bearing formations.

Anther object of the invention is to provide improved methods for detecting the presence of oil in a well by nuclear magnetic resonance phenomena.

Another object of the invention is to provide such methods which yield improved resolution between indications of water and indications of oil.

Yet another object of the invention is to provide novel methods for increasing the difference between the relaxation times of water and oil in a borehole by selectively reducing the relaxation time of oil or water.

Yet a further object of this invention is to provide novel methods for treating residual oil in formations traversed by a borehole to enable detection of such oil in the presence of a water invasion or of connate water.

These and other objects are attained, in accordance with the invention, by introducing into a well paramagnetic ions serving selectively to shorten the relaxation time of protons in water molecules or the in the hydrocarbon molecules, and then detecting by nuclear magnetic resonance techniques the presence of hydrocarbon molecules beyond the wall of the well. The paramagnetic ions are concentrated in the vicinity of the protons in the selected type of molecules by adjusting the relative miscibility of the ions in water and in hydrocarbons, taking into account the tendency for water molecules to be held in clusters about ions by electrical forces. To transport the paramagnetic ions to a desired location in a well, the ions are mixed with well liquid and circulated therewith. As the physical properties of well liquids, especially so-called drilling muds, are carefully adjusted, the paramagnetic ions are introduced in a stable form having substantially no adverse effect upon the liquid used.

The paramagnetic ions are introduced as components of substances employed to effect the purposes of the invention which are defined herein as quenching agents. The quenching agents are compounds of a paramagnetic ion with an organic radical which can be an ion, for instance, the anion of an organic acid or a phenol, or which can be a chelating compound, for example, a $\beta$-diketone or a polycarboxylic substituted polyamine, such as N-substituted ethylene diamine triacetic acid. The quenching agent may, but need not be, ionizable, and the paramagnetic ion may be attached thereto by an ionic or by a homopolar bond.

The quenching agents are operative in the invention because of their physical characteristics. No chemical reactions are known to take place under the conditions by which the compounds are used to detect oil. The compound should be chemically stable under the test conditions, and compounds which tend to decompose under the test conditions are not regarded stable and should not be used.

The paramagnetic ions which are useful in the quenching agents of the invention are selected with consideration of a number of factors determining their suitability, which will be discussed in detail later. In general, it can be said that the preferred paramagnetic ions have a zero orbital angular momentum, and combine with complexing agents to provide stable compounds having substantially different oil and water solubilities and relatively small molecular radii. Such ions are, for example, ferric, $Fe^{+++}$, gadolinium, $Gd^{+++}$, erbium, $Er^{+++}$ and manganous, $Mn^{++}$. Other paramagnetic ions which are useful are cobaltous, $Co^{++}$, nickelous, $Ni^{++}$ and chromic, $Cr^{+++}$.

In one form of the invention, the paramagnetic metal-organic complex is slightly soluble in water and substantially more soluble in hydrocarbons. The complex, which may for example, be iron acetylacetonate, is introduced into a drilling mud at the earth's surface and circulated down to the level to be investigated. Hydrostatic pressure at this level is maintained sufficiently to force mud filtrate into adjacent permeable formations. Any residual oil in such formations receives the metal-organic complex in solution from the mud filtrate. Apparatus serving to detect nuclear magnetic resonance is then lowered into the well to detect the presence of the oil, the relaxation time of the oil having been reduced substantially below that of water molecules by the presence of the paramagnetic ions.

In a second form of the invention, the paramagnetic ion is bound in a paramagnetic metal-organic complex which is preferentially soluble in water. By introducing the complex into an aqueous well liquid, well logging apparatus may readily discriminate between the relaxation times of oil and water to locate any oil which may be contained in permeable formation.

In a third form of the invention, a paramagnetic metal-organic complex about which water molecules tend to cluster is introduced into a well. This complex need not be preferentially soluble, as the clustering effect ensures a proportionately larger reduction in the relaxation time of water than in any oil into which the complex may be dissolved. This complex may, for example, be ferric 1-phenyl-1, 3-butanedione.

In a fourth embodiment of the invention, paramagnetic ions are introduced into the well liquid in the form of water-soluble salts and are circulated down to the level of formations to be investigated.

The invention will be better understood from the following detailed description, taken in conjunction with the drawings, in which.

Figures 1, 2:
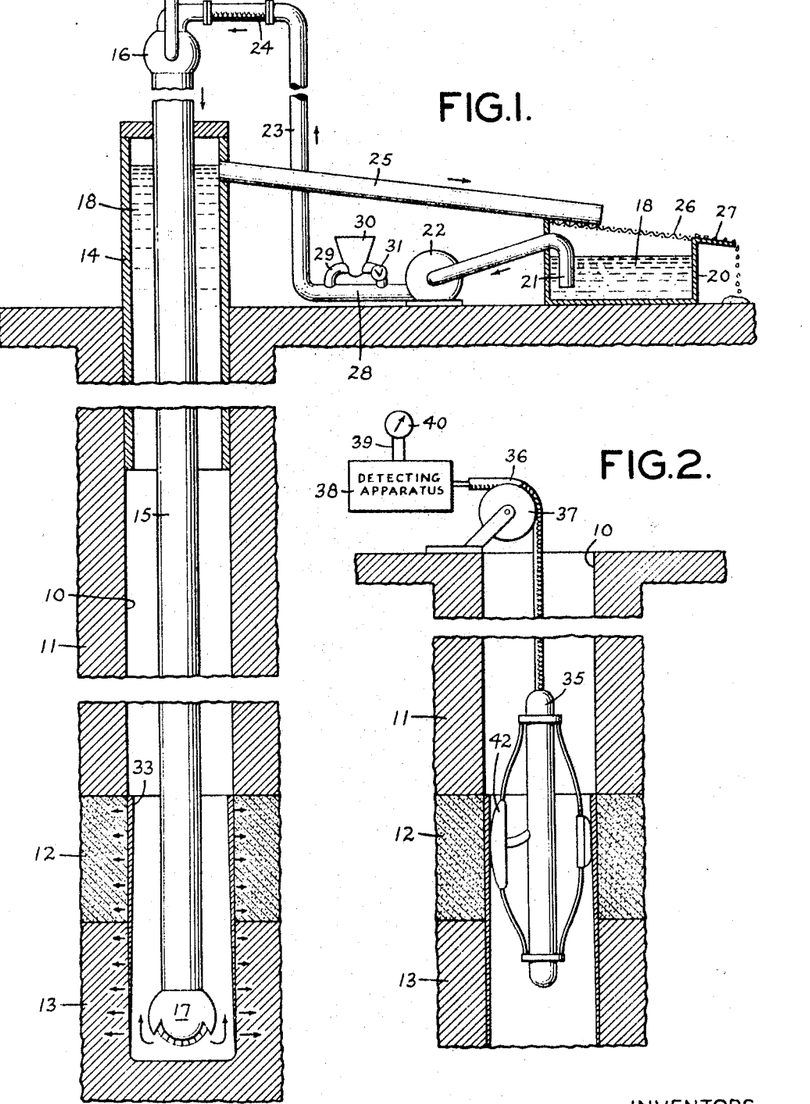
FIG. 1 is a schematic representation of well drilling apparatus arranged for practicing the present invention.
FIG. 2 is a schematic representation of typical apparatus suitable for locating oil in accordance with the present invention, using nuclear magnetic resonance techniques.

In FIG. 1 there is shown a well 10 drilled into the earth and traversing formations 11, including permeable formations 12 and 13. The formation 12 may, for example, be an oil-bearing sand or shale or the like, whereas formation 13 may be taken as containing only water in its pore structure. Extending through a surface string of casing 14 into the well is a drill stem 15 supported from a swivel 16 in the usual manner. In order to cool a drill bit 17 secured to the lower end of the drill stem 15 and to carry away cuttings during the course of drilling, drilling fluid 18 is circulated downwardly through the drill stem 15 past the drill bit 17 and thence upwardly between the drill stem and the wall of the borehole.

To maintain circulation of the drilling fluid 18 through the drill stem and the well, a reservoir 20 is provided, commonly known as a mud pit or tank, in which a sufficient quantity of drilling fluid is stored. Through an intake pipe 21, the drilling fluid is delivered to a sludge pump 22 of any conventional type capable of developing a high pressure in the discharged drilling fluid. The drilling fluid discharged by the pump 22 flows through a stand pipe 23 and a hose 24 into the swivel 16 and drill stem 15 coupled with it. To close the circuit for flow of drilling fluid, a flow line 25 conducts drilling fluid from the annulus between the casing 14 and the drill stem 15 to a so-called shale shaker 26 which serves to separate cuttings 27 from the drilling fluid 18.

Between the pump outlet and the stand pipe 23 is an injection pipe 28 provided with a by-pass tube 29. The tube 29 is in fluid communication with the discharge port of a hopper 30 and has a valve 31 near the inlet connection to the injection pipe 28. By opening the valve 31, the drilling fluid is able to receive materials deposited in the hopper 30 and carry them into the injection pipe 28. The drilling fluid 18, or drilling mud as it is more commonly termed, consists generally of three parts: (1) the liquid phase or water; (2) the colloidal fraction which is the gelling portion and (3) the inert fraction which consists of sand, weight material and other inert solids. The various constituents of drilling fluids are more fully discussed in a book by W. F. Rogers, "Composition and Properties of Oilwell Drilling Fluids," published by the Gulf Publishing Company in 1953. It may be observed, generally, that the physical properties of the drilling fluid are carefully controlled by the use of various additives and are generally dictated by the nature of the formations through which the drill stem has passed. Except under relatively restricted conditions, a water-base drilling fluid is used which has the ability to line permeable formations, such as the formations 12 and 13, with a relatively thin, tough filter cake 33. As illustrated in the vicinity of the formation 13, this filter cake 33 builds up inwardly from the wall of the borehole progressively with time, there being substantially no cake on a freshly drilled formation, such as the formation 13. The filter cake is formed by the deposit of colloidal solids as filtrate from the drilling fluid passes into the pore spaces of adjacent permeable formations. While the filter cake has an appreciable permeability, under proper conditions this permeability is substantially less than that of the underlying permeable formations. By this reduction in permeability, the loss of drilling fluid into the formations is minimized, and the oil bearing formations are protected from undue contamination with drilling mud filtrate. The principal constituent of the filter cake is clay, the clays which have an affinity for water being preferred for their superior gelling properties. Under normal circumstances, then, the filter cake 33 is composed of clay and overlies the wall of each of the permeable formations which have been traversed by the borehole.

In building up the filter cake, an appreciable amount of water passes radially into the formations. The volume of the formation which is thus penetrated commonly is referred to as the invaded zone. It has been estimated that a volume of mud filtrate on the order of 30 cc. enters each square centimeter of the formation wall. The depth of invasion is variable, but with commonly used low-water-loss muds may be taken to be rather shallow. An appreciable amount of the water invasion occurs immediately after a formation has been exposed by further drilling. This effect is illustrated in FIG. 1 by the relative lengths of the arrows indicating radial water flow into the formations 12 and 13. With the increase in the thickness of mud cake formed on a formation wall, the permeability may be so reduced that the exchange of particles through the mud cake may essentially be governed by diffusion processes.

Figure 4A:
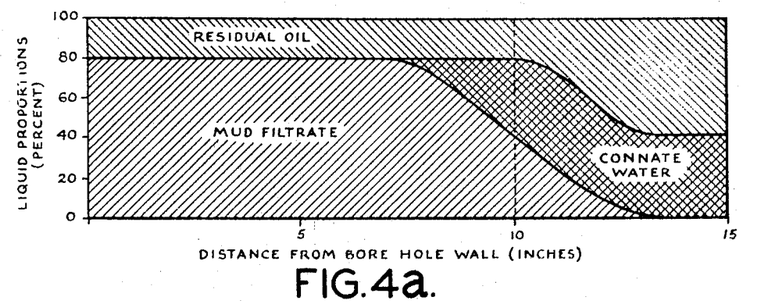
FIGS. 4a and 4b are schematic representations of conditions in permeable earth formations adjacent a well borehole.
Figure 4B:
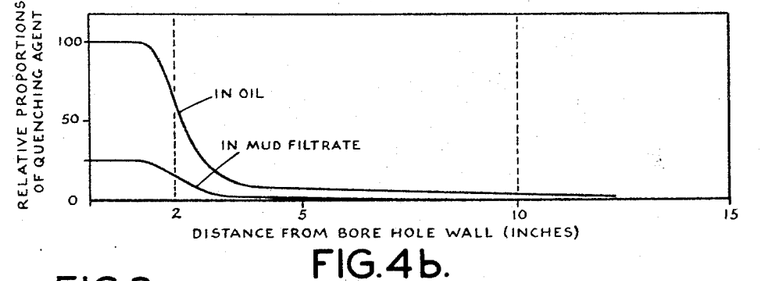

Following the assumption that the formation 12 is an oil-bearing formation, while the formation 13 is an underlying water-bearing formation, the invaded zones of these respective formations may be distinguished in that a certain percentage of oil with which the pore structure of the formation 12 has been wetted will remain. This residual oil which is not flushed by the mud filtrate from the pores of the formation 12 commonly comprises 10–30% of the oil originally contained in the formation prior to flushing by the mud filtrate, as shown in FIG. 4a. In the case of a gas-bearing formation, such as a gas sand, the residuum is oil in the form of a condensate or liquefied gas, except in instances where the gas is present in the so-called dry state. The residual oil remaining in the invaded zone does not usually constitute a continuous phase but is rather dispersed, the dispersed portions being in communication via the continuous water phase. FIG. 4b illustrates the effect of adding a quenching agent to the formation which is slightly soluble in water and substantially more soluble in oil.

Such are the conditions normally existing in a drilled well from which the recovery of oil is sought. To enable effective recovery operations, means are employed in accordance with this invention for locating oil by nuclear magnetic resonance techniques. Such means are shown in FIG. 2 to comprise a pressure resistant housing 35 of generally slender, cylindrical configuration adapted for movement longitudinally through the well 10. The housing 35 is suspended from an electric cable 36 for raising and lowering by a winch 37 at the earth's surface. The cable 36 serves to connect electrical elements associated with the housing 35 to detecting apparatus 38 at the earth's surface. Connected to the output of the detecting apparatus 38 by leads 39 is an indicating device 40 which may, for example, be a recording galvanometer of the type conventionally employed in well logging.

While the electrical elements associated with the housing 35 and with the detecting apparatus 38 have a variety of forms as are represented by apparatus disclosed in the above-cited applications, there is generally associated with the housing 35 a wall-engaging portion 42 which is resiliently urged into engagement with the borehole wall as the housing 35 slowly traverses a borehole. This portion 42 generally encloses one or more induction coils in which resonance signals characterizing the material beyond the borehole wall may be induced. As described in copending application, Ser. No. 478,860, filed Dec. 30, 1954, now Patent No. 2,878,443, the depth of investigation obtained with the detecting portion 42 may lie within a given depth zone. This depth zone may, for example, correspond with the invaded zone in permeable formations underlying the filter cake 33.

Figure 3:
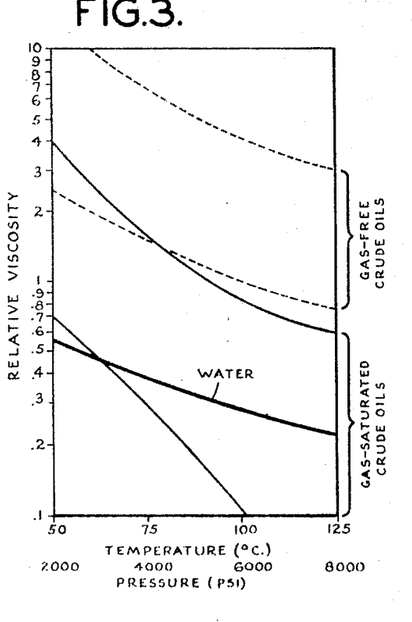
FIG. 3 is a chart showing typical variations in the viscosity of water and hydrocarbons with borehole temperatures and pressures.

While, as pointed out heretofore, the resonance characteristics of oil and water may readily be distinguished under laboratory conditions, under borehole conditions of temperature and viscosity a resolution of signals representing the respective resonance characteristics may be exceedingly difficult as illustrated in FIG. 3. Assuming that the resonance detecting apparatus serves to establish a steady magnetic field of intensity $H_0$ in the volume of the formation investigated, there is added to the difficulty of resolving similar resonance characteristics, the further difficulty of obtaining a good signal-to-noise ratio in the presence of inhomogeneities in the steady magnetic field. Considering the matter in greater detail, the relaxation time $T_1$ of both oil and water is given, to a first approximation, by the expression:

$$T_1 \simeq \frac{KT}{\eta} \qquad (1)$$

where T is the absolute temperature in degrees Kelvin and $\eta$ is viscosity in poise. Under laboratory conditions the viscosity of crude oil, that is, oil as derived from earth formations is about 100 times greater than that of water. Under drill hole conditions of high temperature and pressure the viscosity of gas-free crude oil is on the order of ten times greater than that of water, as may be observed from the graph of FIG. 3. When the crude oil is saturated with gas, however, the viscosities of crude oil and water overlap with light oils actually having a viscosity below that of water for corresponding temperatures. While the temperature and pressure gradients, as well as the depths of wells vary greatly in the various oil producing regions, it will be evident that the increasing temperature and pressure at depths in a well render more difficult the distinguishing of oil from water by conventional nuclear magnetic resonance techniques. The extent to which most crude oils are saturated with gas has not clearly been determined but is considered to be about 50 to 100%. The lowered viscosity of crude oil occasioned by the presence of gas is seen from expression (1) to increase the relaxation time of the oil. Experimental measurements of gas-loaded crude oil samples under laboratory controlled conditions tend to substantiate theoretical considerations which underlie the described difficulties in resolving resonance signals obtained from suitable detecting apparatus.

In addition to this tendency for the relaxation time of oil to be increased under borehole conditions toward the relaxation time of water, there are thought to be additional effects of a physical nature tending to reduce the relaxation time of water toward that of oil. Since the water which invades permeable formations is generally contained within minute interconnecting pores, a very substantial portion of this water is in the surface layer in contact with the formation material. According to the Helmholtz Double Layer theory, the surface of a liquid may be regarded as defined by two oppositely charged layers, one of which is fixed to the containing surface and one of which is more or less free to move with the liquid. This separation results in a potential gradient which may be expected to influence strongly liquid molecules of a polar character, that is, molecules exhibiting an effective electric charge separation. Whereas water exhibits strong polar characteristics, crude oil is only slightly polar. Accordingly, the water molecules in the pore structure of permeable formations are subject to a degree of restriction in motion determined by the interaction of the molecular dipole with the electric field gradient at the water surface. The surface layer, therefore, has an effect similar to that of increased viscosity which results in a corresponding decrease in the relaxation time of water entrained in the pores. While this effect is dependent upon the pore size and other factors, it may reasonably be expected that the relaxation time of water in small pores will range anywhere from about 20 milliseconds to 2.5 seconds.

Additionally, water present in the clay material of the filter cake is subject to strong bonding forces due to the adsorption properties of clay. Water which is present in the filter cake may, accordingly, be expected to have an appreciably reduced relaxation time.

Each of these physical conditions present at depths in a borehole are seen to lead toward an overlapping of the relaxation times of water and oil located in the vicinity of the borehole. In accordance with the present invention, a measurable difference in nuclear magnetic resonance characteristics of oil and water is secured by introducing paramagnetic ions in soluble form into the borehole for selectively reducing the relaxation time of either the water or the oil phase. The proton relaxation times of water or oil can be considerably decreased by the addition of greater than about $10^{-10}$ seconds. As observation of electron relaxation times less than about $10^{-10}$ seconds is difficult if not impossible, paramagnetic ions are found to be effective when they have an observable electron resonance. Under borehole conditions, a concentration of paramagnetic ions on the order of about $10^{-18}$ ions per cc., or greater, serves to change the relaxation time of protons in oil or water. This ion concentration exceeds by many orders of magnitude the concentration of impurities which may be expected in a borehole under ordinary conditions.

Compounds including paramagnetic ions which are operative, when added to oil or water, to reduce their proton relaxation times by a substantial amount have been defined above as quenching agents. The appropriateness of this term will be understood by reviewing briefly the relaxation mechanism with respect to macroscopic moments. When nuclear magnetic resonance is established in a volume element containing, for example, protons in the presence of a steady magnetic field, the macroscopic element precesses about the direction of the steady magnetic field. Under the influence of thermal perturbations, the component of magnetic moment in the direction of the field will build up exponentially with a characteristic time constant $T_1$, which is called the "thermal" or "longitudinal" relaxation time. As paramagnetic ions may exhibit a magnetic moment on the order of about one thousand times greater than the magnetic moment associated with nuclei, the addition of such ions to the volume element subjects the protons to relatively strong local magnetic fields. In a qualitative sense, the relaxation time may be understood as the rate at which the nuclear spin system will reach thermal equilibrium with the surroundings. The rapidity with which this energy exchange is made, and hence the shortness of the relaxation time, depends upon the interaction between the nuclei in resonance and their surroundings, being termed the spin-lattice interaction. The strong moment associated with paramagnetic ions associated with the quenching agent increases the rate of decay by interacting strongly with the nuclear moments.

The effectiveness of given paramagnetic ions is dependent roughly upon their magnetic moment and the numbers of ions in effective proximity to the resonating nuclei. The paramagnetic ions which are suitably employed as quenching agents, therefore, are those which are miscible in oil or water, or both, and interact with protons to shorten the proton relaxation time. In combining the factors of miscibility or solubility and magnetic interaction, a suitable quenching agent has a substantially greater effect upon protons in water or those in oil.

To determine more precisely the criteria for selecting paramagnetic ions as quenching agents for the practice of this invention, it is desirable to refer to underlying theory developed by N. Bloembergen, E. M. Purcell, and R. V. Pound and reported in an article entitled "Relaxation Effects in Nuclear Magnetic Resonance," in volume 73 of the Physical Review (1948) at page 679. This theory is based upon a simplifying assumption that the motion of molecules in a liquid may be characterized by a single correlation time $\tau_c$, which is characteristic of the random motion and affords a measure of the time in which the atomic configuration about the nucleus in question changes appreciably. The following expression is there derived for the spin-lattice relaxation time $T_1$:

$$(1/T_1) = 0.4 \left( \frac{\tau c}{1 + 4\pi^2 2v^2 \tau c^2} + \frac{2\tau c}{1 + 16\pi^2 v^2 \tau c^2} \right) \gamma 4\hbar 2 I_\text{p}(I_\text{p}+1) b^{-6} \quad (2)$$

where $v$ is the frequency of observation, $\gamma$ is the gyromagnetic ratio, $I_\text{p}$ is the nuclear spin, $\hbar$ is Planck's constant and $b$ is the mean distance between nuclear moments. While this equation is directed to proton-proton interactions, it may be applied with modification to proton-ion interactions. Thus, in approximating the effect of paramagnetic ions in solution with the proton-containing molecules, the expression for the quenched relaxation time $T_q$ is as follows:

$$\frac{1}{T_q} = \frac{1}{T_1} + \frac{4\pi^2}{KT} \gamma_\text{p}^2 \gamma_i^2 \hbar^2 s(s+1) N_i \eta \quad (3)$$

where $s$ is the ion spin and $N_1$ is the number of ions per unit volume of water or hydrocarbon. In this expression, the orbital contribution to the magnetic moment of the ion is neglected. While in a number of practical instances the neglect of orbital effects is justified, in cases where the orbital effects are important, $$\gamma_i \hbar^2 s(s+1)$$

may be replaced by $\mu^2_\text{eff}$, that is the square of the effective magnetic moment $\mu_\text{eff}$ of the ion.

In deriving expression (3), the effective radius of the ion group is taken equal to the radius of the proton containing molecule, and the proton-proton interaction is considered only as a nearest neighbor interaction. Among the specific quenching agents which are mentioned hereafter, are some having a much greater radius R than the radius $a$ of the proton-containing molecule. In such cases, a slightly better approximation to $T_q$ may be made by letting $\tau_c$ in Equation 2 be given by $$\tau_c = \frac{\pi k a}{kT} r^2 \quad (4)$$

and integrating the proton-ion interaction from $r = (a+R)$ to infinity. The integrals may be approximated by assuming a $1/r^2$ dependence of the integrand and cutting off the integrals when the denominators of the bracketed terms equal two. The result is $$\frac{1}{T_q} = \frac{1}{T_1} + \frac{1}{T_1^1} \quad (5)$$

where $$\frac{1}{T_1^1} = \frac{8\pi^2 \eta}{kT} \left( \frac{a}{a+r} \right) \cdot N_i \gamma_\text{p}^2 \gamma_i^2 \hbar^2 s(s+1) \{1 - c(a+R)\} + \ldots \quad (6)$$

The factor $c$ is given by $$c = 32.6 (v_0 n a / kT)^{1/2} \quad (7)$$

Considering the relationship of $1/T_1'$ to R expressed in Equation 6, increasing values of R are seen to diminish the value of $1/T_1'$. As a result, the relaxation time $T_q$ with a quenching agent approaches the relaxation time $T_1$ without quenching, that is, the quenching agent becomes less effective. In quantitative terms a paramagnetic ion, to be effective must not be contained in a molecule of radius greater than about 10 A. Otherwise, the paramagnetic ion is effectively shielded by diamagnetic particles and does not contribute to a reduction in the relaxation time of the protons. In general, then, paramagnetic ions may be employed satisfactorily as a quenching agent provided the molecules with which the ion is associated have an effective radius less than about 10 A. or otherwise do not serve diamagnetically to shield the paramagnetic ions.

In the development of Equation 6, the paramagnetic ion is considered to have its magnetic moment fixed with respect to the main field direction. That is, a proton could move into and out of the sphere of influence of the ionic moment without the ion having a change in magnetic state. The ion has been considered effectively to have a relaxation time $\rho_1$ which is long with respect to the correlation time $\tau_c$ of the proton translational motion. To express the relationship quantitatively, by way of example, an ionic relaxation time $\rho_1$ on the order of $10^{-7}$ is considered to be desirably long with respect to a proton correlation time $\tau_c$ on the order of $10^{-11}$ to $10^{-13}$ which will hold generally for the translational motion of protons in water molecules.

The shortness of the ionic relaxation time $\rho_1$ is determined largely by the extent to which the spin moment is coupled to an orbital moment and thence to the lattice. Thus, it may be observed that the spin moment is not appreciably coupled to the lattice in a direct manner and hence will be largely unaffected by the thermal agitation which characteristically results in shortness of relaxation time. Consequently, for those ions in which the paramagnetic electrons are in higher angular momentum states, the orbital moment is generally so large that tight coupling is effected between the spin moments and the lattice, reducing the ionic relaxation time to the point where the ions of the quenching agent have a negligible effect upon the relaxation times of the protons. An approximate quantitative determination of the lower limit $\rho_1$ for effectiveness of given paramagnetic ions may be obtained by considering that the relaxation time $\rho_1$ sets an upper limit for the nuclear moment correlation time $\tau_c$. Using this upper limit and integrating Equation 2 in the same manner as was employed to derive expression (6), there is obtained the following expression:

$$\frac{1}{T_1^1} = \frac{8\pi^2\eta}{kT} \cdot N_i \gamma_p^2 \gamma_i^2 \hbar^2 s(s+1) \left(\frac{a}{a+R}\right) \left[1 - \left(\frac{\pi k a}{kT\rho_1}\right)^{1/2}(a+R)\right] + \ldots \quad (8)$$

by entering nominal values of $\eta$, $a$, and $T$ in this approximate relationship (8) it is found that $\rho_1$ must be greater than about $10^{-11}$ seconds before the quenching agent will be effective in reducing the nuclear relaxation time.

Accordingly, in the practice of the present invention those paramagnetic ions are preferred which have no orbital angular momentum. In the iron group both the ferric ion $Fe^{+++}$ and the manganous ion $Mn^{++}$ have zero orbital momentum and in the rare earth group, the gadolinium ion $Gd^{+++}$. Other ions such as $Cu^{++}$, $Ni^{++}$ and $Cr^{+++}$ may be quite effective in spite of a non-zero orbital angular momentum. Thus, the paramagnetic ion erbium $Er^{+++}$ in the rare earth group has an orbital angular momentum L of 5 and is yet found to be quite effective.

A practical criterion for determining whether a quenching agent will be useful in reducing the nuclear relaxation of protons is the observation of an electron paramagnetic resonance in the quenching agent which has a band width narrower than approximately 500 gauss. Observation of this narrow resonance in a quenching agent ensures at least that the paramagnetic ion is suitable for the practice of the present invention. In most applications, however, the ferric ion which is the trivalent of iron with a valence electron removed, is used with advantage.

While the form of the paramagnetic ions in solution comprising the quenching agent may be widely varied in the broadest aspect of the invention to suit particular borehole conditions or for advantageous handling, in a preferred form of the invention the paramagnetic ions are introduced into the borehole as a paramagnetic metal-organic complex. A complex is of the metal-organic type when a metal ion combines with an organic electron donor group, otherwise known as an electron-donating complexing agent. Electron-pair bonds are formed between the electron-accepting metals and the organic complexing agent which may be essentially ionic or essentially covalent depending upon the metals and donor atoms involved. The donor atoms are generally nitrogen, oxygen and sulphur.

Knowing the physical constants of a substance containing a paramagnetic ion, it is possible to predict within limits the suitability of the substance as a quenching agent. Whether it is desired to selectively reduce the relaxation time of protons in oil or protons in water, a criterion of suitability is provided by the figure of merit F defined in the following expression:

$$F = \left(\frac{T_1}{T_q} - 1\right) \frac{1}{c} \quad (9)$$

where $c$ is the ion concentration in parts per thousand required to produce a quenched relaxation time $T_q$ for a substance having an unquenched relaxation time $T_1$. Inasmuch as the figure of merit varies inversely with the ion concentration $c$, the usefulness of the quenching agent will be dependent in many cases on its solubility in water or in oil.

To facilitate laboratory experimentation with various quenching agents whereby their effectiveness in water and oil is contrasted, the figure of merit in oil under borehole conditions may be obtained under laboratory conditions of temperature and pressure by determining the figure of merit in xylene. That is to say, xylene is found to have physical properties such as viscosity and ability to dissolve the sample of complexes, which are representative of those of crude oil under borehole conditions. Representing the results of such laboratory determinations of figures of merit is the following group of quenching agents which have been found suitable for selectively lowering the proton relaxation time in the water phase:

The ferric complex of N-hydroxyethyl ethylene diamine triacetic acid (Versene OL) which has a figure of merit for water of approximately 40 and a solubility of 23,000 p.p.m. while its solubility in xylene is less than 30 p.p.m.;

The ferric complex of Cheelox B–14, which is a mixture of soluble salts of amino carboxylic acids, and has a figure of merit in water of 116, a solubility in water of 6800 p.p.m. and a solubility in xylene of less than 30 p.p.m.;

Ferric kojate which has a figure of merit in water of 270 and a water solubility of at least 1500 p.p.m., while its xylene solubility is less than 30 p.p.m.;

The ferric complex of sodium tetra hydroxy-quinone which has a figure of merit in water of 59, a water solubility of about 3000 p.p.m. and a xylene solubility of less than 30 p.p.m.;

Ferric tartarate which has a figure of merit in water of 138 (at pH 3) and solubilities of 17,400 p.p.m. in water and less than 12 p.p.m. in xylene; and Cupric, nickel and cobalt complexes of N-hydroxy ethylene diamine triacetic acid (Versene OL) which have figures of merit in water of 45, 19 and 63, and water solubilities of 15,000, 47,500 and 26,000 p.p.m., respectively, while their xylene solubilities are negligible.

Inasmuch as the suitability of a given metal-organic complex as a quenching agent will depend not only upon the figure of merit but also upon the respective solubilities of the complex in water and oil, determinations as represented above serve effectively as a guide in the selection of suitable complexes for a quenching agent. It will be noted from the above that the most suitable quenching agents for water have a figure of merit-solubility product of at least 50,000 for the water phase and very low solubility in the xylene phase. While the given figures of merit have been obtained by laboratory measurement of $T_1$, $T_q$ and $c$, the figure of merit may be determined within a reasonable approximation by computation using the theoretically-derived expressions given above. In selecting suitable quenching agents by computational methods, however, the figure of merit for a given complex in water should be increased in accordance with the tendency of the complex molecules to hold polar water molecules clustered in proximity to the paramagnetic ion. This clustering effect, which is not accounted for in the expressions given above and is not subject to any well-developed theory, effectively results in an increased correlation time $\tau_c$ for the translational motion of water-contained protons. Since an increase in this correlation time signifies a stronger magnetic interaction experienced between the protons and the paramagnetic ions, it may be expected to result in a correspondingly reduced relaxation time $T_q$ effected by the quenching agent. As hydrocarbons found in oil and oil condensate are substantially non-polar, this clustering effect does not occur, consequently, the reduction in relaxation time effected by a quenching corresponds quite well with computed values derived from the above expressions.

In the practice of the present invention, it is desirable in some instances to add a quenching agent to the oil phase in a formation in order to reduce the proton relaxation time of the oil phase distinguishably below that of the water phase. Quenching agents suitable for this are:

The ferric complex of acetyl acetone having figures of merit of 31 in xylene and 59 in water, and solubilities of 12,000 p.p.m. in xylene and 100 p.p.m. in water;

The chromic complex of acetyl acetone having figures of merit of 24 and 43 and solubilities of 5600 p.p.m. and 150 p.p.m. in xylene and water, respectively; and Chromium oxyquinoline benzoate which has figures of merit of 24 and 6 and solubilities of 1000 p.p.m. and 44 p.p.m for xylene and water, respectively.

It will be noted that in addition to having a xylene figure of merit-solubility product of at least 50,000 and a water product of less than 5000, the most suitable quenching agents in this case have water solubilities greater than about 50 p.p.m., thus permitting the agent to be carried to an oil-bearing formation through intermediate water-bearing formations.

Although its water solubility is less than 12 p.p.m., ferric naphthenate is otherwise suitable as a quenching agent for oil, having a figure of merit of 329 and a solubility of 60,000 p.p.m. in xylene. Thus, it might be advantageously added to an oil-base drilling mud to selectively decrease the proton relaxation time of oil. In addition, this compound is useful in measurements of relaxation time in core samples and drill chips.

In order to introduce the quenching agent into the oil phase of the formation, the drilling fluid 18 is employed as a carrier for the quenching agent from the earth's surface to the pore structure of permeable formations. Thus, the quenching agent is added to the drilling fluid as it passes through the injector section 28 and is carried down the drill stem 15 through the drill bit 17 and then reversed in flow to pass upwardly in contact with the walls of the formations. To obtain the greatest concentration of quenching agent in the dispersed residual oil within the invaded zone of permeable formations, the quenching agent is introduced into the drilling fluid 18 as the borehole is being drilled. In this way, the quenching agent may flow with the drilling fluid into freshly bored permeable formations without being impeded by the subsequently formed filter cake 33.

On the other hand, the quenching agent may be introduced a sufficient time in advance of a logging operation but while drilling is stopped since the finite permeability of filter cakes will allow diffusion of the quenching agent into any residual oil which may be present in underlying permeable formations. When the quenching agent has had a sufficient opportunity to become concentrated in the residual oil, and the drill stem has been removed from the well, a logging operation may be undertaken to detect the presence of oil by nuclear magnetic resonance techniques. The housing 35 of the detecting apparatus employed in this operation is lowered into the well and moved past formations which are to be investigated for the presence of oil. By observing the resonance indications provided by the device 40, the depths at which a signal representing the occurrence of a short relaxation time for oil may be noted. Furthermore, the magnitude of signals representing occurrence of the shortened relaxation time may provide a measure of the number of oil molecules at any depth contributing to the observation of a shortened relaxation time. The magnitude of such signals will thus provide an approximate indication of the residual oil saturation. Moreover, by detecting resonance in any residual oil present in permeable formations at two different times, one of which follows shortly after introduction of the quenching agent to the formation, the change in signal strength occurring during the time interval may provide an approximate measure of the permeability of the formation. If desired, the detector may be passed through the well prior to introduction of the quenching agent in order that differential indication may be obtained which is dependent solely upon the quenching effect.

The method practiced with a quenching agent which selectively reduces the relaxation time of the water phase is similar to that practiced with quenching agents selectively operative in the oil phase. However, in this case the detecting apparatus 38 is arranged to yield a selective indication of the longer relaxation time corresponding to the presence of residual oil. This may be accomplished, for example, by sampling the resonance signal at a time interval after the contribution from the water phase has decayed, that is, a time interval somewhat longer than the shortened relaxation time of the water phase. On the other hand, a record may be obtained of the type shown in FIG. 8 of the above-identified Patent No. 3,289,072 for indicating the abundance of both oil and water at the various depths which are logged.

The amount of a given quenching agent which must be added to the drilling fluid to reduce the porton relaxation time of the water phase is dependent upon the volume of the drilling fluid column to be treated, the solubility of the quenching agent in the water phase and its figure of merit in the water phase. With a longer time allowed for the invading process to carry the quenching agent into permeable formations, a lesser amount of quenching agent is required. If advantage is taken of the high permeability of a freshly bored permeable formation, a relatively small amount of quenching agent may effectively be spotted in the desired formations.

Figure 5:
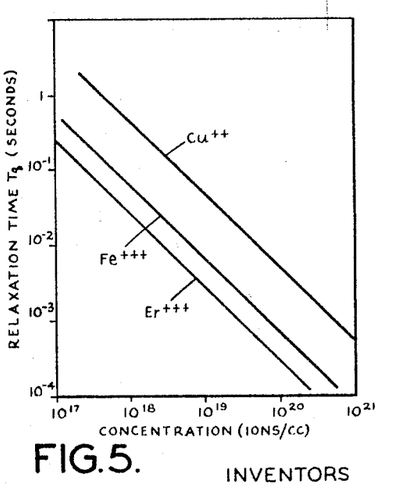
FIG. 5 is a graphical illustration showing the effect of paramagnetic ions on the proton relaxation time of water.

Referring now to FIG. 5, is will be evident that the quenched relaxation time $T_q$ varies logarithmically with the ion concentration of the quenching agent and is somewhat dependent upon the choice of paramagnetic ion. While erbium ($Er^{+++}$) is seen to be the more effective of the representative ions including cupric and ferric ions, the ferric ion is yet preferred by reason of its abundance and lower expense. The graph of FIG. 5, on the other hand, demonstrates that a further treatment of a given well with a more effective quenching agent or with a quenching agent applied to the selected phase in greater concentration may result in a more ready location of oil, if a previous treatment has not been successful. In general, however, the theoretical considerations which are reviewed herein coupled with a measure of experience will ensure successful quenching treatments of wells with a single application of the quenching agent, except in unusual circumstances.

It is to be noted that the quenching agents composed of metal-organic complexes may broadly be classed as salts of organic carboxylic acids, soaps, chelates such as $\beta$-diketones and polycarboxylic substituted diamines and substituted phenols. It may be observed that, as the most desirable quenching agents do not predominate in any of these chemical classifications, the selection of suitable substances as quenching agents is on the basis of physical, rather than chemical properties.

While the injection of the quenching agent in drilling fluid delivered by the sludge pump to the interior of the drill stem has been shown, other methods of introducing the quenching agent may alternatively be practiced. If desired, for example, the quenching agent could be loaded in a so-called dump bailer, such as is customarily employed in cementing operations, and released opposite formations to be investigated. In the case of cable tool drilling, the quenching agent may be added to water in the bailer which is dumped on the bottom of the hole to make new mud for spending cuttings as drilling progresses. There, by diffusion, the quenching agent will pass into residual oil in the formations being drilled. Where it is desired to obtain a log of an uncased well which has been completed by the setting of production tubing, the quenching agent may be circulated through the production tubing in weighting fluid with which the well is loaded. Other methods of introducing the quenching agent may occur to those skilled in the art.

We claim:

1. A method for detecting the presence of oil in a well formation comprising introducing into the formation paramagnetic metal-organic complex ions operative to reduce selectively the nuclear magnetic precession relaxation time of protons in water with respect to those in oil, inducing nuclear magnetic precession in protons present in the formation, and measuring the nuclear magnetic precession relaxation times of the protons present in the formation.

2. A method for detecting the presence of oil in a well formation comprising introducing into the formation paramagnetic metal-organic complex ions operative to reduce selectively the nuclear magnetic precession relaxation time of protons in oil with respect to those in water, inducing nuclear magnetic precession in protons present in the formation and measuring the nuclear magnetic precession relaxation times of the protons present in the formation.

3. A method for detecting the presence of oil in a well formation comprising introducing into the formation a qunching agent containing paramagnetic metal-organic complex ions which is more soluble in water than in oil, inducing nuclear magnetic precession in protons present in the formation, and measuring the nuclear magnetic precession relaxation times of the protons present in the formation.

4. A method for detecting the presence of oil in a well formation comprising introducing into the formation a quenching agent containing paramagnetic metal-organic complex ions which is more soluble in oil than in water, inducing nuclear magnetic precession in protons present in the formation, and measuring the nuclear magnetic precession relaxation times of the protons present in the formation.

5. A method for detecting the presence of oil in a well formation containing water comprising introducing into the formation a quenching agent containing organic molecules about which the molecules of water tend to cluster and including a paramagnetic metal ion in each molecule, inducing nuclear magnetic precession in protons present in the formation and measuring the nuclear magnetic precession relaxation times of the protons present in the formation.

6. A method for detecting the presence of oil in a well formation wherein the oil is separated from the accessible surface of the formation by a water barrier comprising introducing into the formation a quenching agent containing paramagnetic metal-organic complex ions which is slightly soluble in water and substantially more soluble in oil, inducing nuclear magnetic precession in protons present in the formation and measuring the nuclear magnetic precession relaxation times of the protons present in the formation.

7. A method for detecting the presence of oil in a well formation comprising adding to fluid in a well a metal-organic complex which includes a paramagnetic metal ion in each organic molecule and which is relatively more soluble in water than in oil, thereby introducing the complex into formation adjacent said fluid, inducing nuclear magnetic precession in protons present in the formation and measuring the nuclear magnetic precession relaxation times of the protons present in the formation.

8. A method according to claim 7 wherein the complexing agent is an ethylene diamine triacetic acid chelating agent.

9. A method according to claim 7 wherein the complexing agent is kojic acid.

10. A method for detecting the presence of oil in a well formation wherein the oil is separated from the accessible surface of the formation by a water barrier comprising introducing into a well fluid a metal-organic complex including a paramagnetic metal ion in each organic molecule which is slightly soluble in water and substantially more soluble in oil, thereby introducing the complex into formation adjacent said fluid, inducing nuclear magnetic precession in protons present in the formation and measuring the nuclear magnetic precession relaxation times of the protons present in the formation.

11. A method according to claim 10 wherein the complexing agent is acetyl acetone.

12. A method according to claim 10 wherein the complexing agent is oxyquinoline benzoate.

13. A method for detecting the presence of oil in a well formation comprising adding an oil-soluble quenching agent containing metal-organic complex ions to an oil-base drilling mud, introducing the mud into the well, inducing nuclear magnetic precession in protons present in the formation, and measuring the nuclear magnetic precession relaxation times of the protons present in the formation.

14. A method according to claim 13 wherein the quenching agent is ferric naphthenate.

15. A method for determining the presence of oil in a well formation comprising inducing nuclear magnetic precession in protons present in the formation, measuring the residual nuclear magnetic precession relaxation times of the protons contained in the formation, introducing into the formation a quenching agent containing metal-organic complex ions operative to produce a substantial difference between the nuclear magnetic precession relaxation times of protons in oil and water, inducing nuclear magnetic precession in protons present in the formation and again measuring the nuclear magnetic precession relaxation times of the protons contained in the formation.

16. Amethod for detecting the presence of oil in a well formation through which a borehole containing drilling fluid passes comprising adding to the drilling fluid paramagnetic metal-organic complex ions operative to reduce selectively the nuclear magnetic precession relaxation time of protons in water with respect to those in oil, circulating the drilling fluid past a formation to be investigated at a hydrostatic pressure exceeding the fluid pressure in the formation, inducing nuclear magnetic precession in protons present in the formation, and measuring the relaxation times of the protons present in the formation.

17. A method for detecting the presence of oil in a well formation through which a borehole containing drilling fluid passes comprising adding to the drilling fluid paramagnetic metal-organic complex ions operative to reduce selectively the nuclear magnetic precession relaxation time of protons in oil with respect to those in water, circulating the drilling fluid past a formation to be investigated at a hydrostatic pressure exceeding the fluid pressure in the formation, inducing nuclear magnetic precession in protons present in the formation, and measuring the relaxation times of the protons present in the formation.

18. A method for detecting the presence of oil in a well formation through which a borehole containing drilling fluid passes comprising adding to the drilling fluid a quenching agent containing paramagnetic metal-organic complex ions which is more soluble in water than in oil, circulating the drilling fluid past a formation to be investigated at a hydrostatic pressure exceeding the fluid pressure in the formation, inducing nuclear magnetic precession in protons present in the formation, and measuring the relaxation times of the protons present in the formation.

19. A method for detecting the presence of oil in a well formation through which a borehole containing drilling fluid passes comprising adding to the drilling fluid a quenching agent containing paramagnetic metal-organic complex ions which is more soluble in oil than in water, circulating the drilling fluid past a formation to be investigated at a hydrostatic pressure exceeding the fluid pressure in the formation, inducing nuclear magnetic precession in protons present in the formation, and measuring the relaxation times of the protons present in the formation.

References Cited
UNITED STATES PATENTS

| | | | |
|---|---|---|---|
| 3,135,912 | 6/1964 | Baker | 324—0.5 |
| 3,188,556 | 6/1965 | Worthington | 324—0.5 |
| 3,213,354 | 10/1965 | Baker | 324—0.5 |

RUDOLPH V. ROLINEC, Primary Examiner

M. J. LYNCH, Assistant Examiner

UNITED STATES PATENT OFFICE
CERTIFICATE OF CORRECTION

Patent No. 3,456,183          Dated July 15, 1969

Inventor(s) R. S. Codrington et al.

It is certified that error appears in the above-identified patent and that said Letters Patent are hereby corrected as shown below:

Column 1, line 59, "including" should be -- inducing --

Column 7, line 21, after "of" insert -- paramagnetic ions having electron relaxation times --

Column 8, line 28, "$N_1$" should be -- $N_i$ --

SIGNED AND SEALED

DEC 9 - 1969

(SEAL)
Attest:

Edward M. Fletcher, Jr.
Attesting Officer

WILLIAM E. SCHUYLER, JR.
Commissioner of Patents